United States Patent
Fahrenbruch

(10) Patent No.: US 7,919,952 B1
(45) Date of Patent: Apr. 5, 2011

(54) AUTOMATIC GAIN CONTROL TECHNIQUE FOR CURRENT MONITORING IN CURRENT-MODE SWITCHING REGULATORS

(75) Inventor: Shawn Anthony Fahrenbruch, Tustin, CA (US)

(73) Assignee: Microsemi Corporation, Irvine, CA (US)

( * ) Notice: Subject to any disclaimer, the term of this patent is extended or adjusted under 35 U.S.C. 154(b) by 1780 days.

(21) Appl. No.: 11/084,892

(22) Filed: Mar. 21, 2005

(51) Int. Cl.
G05F 1/652 (2006.01)
G05F 3/16 (2006.01)

(52) U.S. Cl. ........ 323/222; 323/282; 323/284; 323/285; 323/286; 323/223

(58) Field of Classification Search .................. 323/222, 323/282, 284, 285, 286, 223, 224
See application file for complete search history.

(56) References Cited

U.S. PATENT DOCUMENTS

| | | | |
|---|---|---|---|
| 4,357,572 A | 11/1982 | Andersen et al. | |
| 4,837,495 A | 6/1989 | Zansky | |
| 4,975,820 A | 12/1990 | Szepesi | |
| 5,028,861 A | 7/1991 | Pace et al. | |
| 5,079,453 A | 1/1992 | Tisinger et al. | |
| 5,600,234 A * | 2/1997 | Hastings et al. | 323/282 |
| 5,723,974 A | 3/1998 | Gray | |
| 5,734,259 A * | 3/1998 | Sisson et al. | 323/282 |
| 5,847,554 A | 12/1998 | Wilcox et al. | |
| 5,877,611 A * | 3/1999 | Brkovic | 323/222 |
| 5,912,552 A | 6/1999 | Tateishi | |
| 5,929,620 A | 7/1999 | Dobkin et al. | |
| 5,949,229 A * | 9/1999 | Choi et al. | 323/320 |
| 5,982,160 A | 11/1999 | Walters et al. | |
| 6,101,106 A | 8/2000 | Shi | |
| 6,144,194 A | 11/2000 | Varga | |
| 6,157,180 A | 12/2000 | Kuo | |
| 6,181,120 B1 * | 1/2001 | Hawkes et al. | 323/282 |
| 6,198,265 B1 | 3/2001 | Stevenson | |
| 6,222,356 B1 | 4/2001 | Taghizadeh-Kaschani | |
| 6,232,755 B1 | 5/2001 | Zhang | |
| 6,366,070 B1 | 4/2002 | Cooke et al. | |
| 6,369,665 B1 | 4/2002 | Chee et al. | |
| 6,472,856 B2 | 10/2002 | Groom et al. | |
| 6,476,589 B2 * | 11/2002 | Umminger et al. | 323/282 |
| 6,495,993 B2 | 12/2002 | Eager | |

(Continued)

OTHER PUBLICATIONS

National Semiconductor, "LM3488: High Efficiency Low-Side N-channel Controller for Switching Regulators". National Semiconductor Corporation. May 2003, pp. 1-24.

(Continued)

*Primary Examiner* — Bao Q Vu
(74) *Attorney, Agent, or Firm* — Knobbe, Martens, Olson & Bear LLP

(57) ABSTRACT

A current-mode switching regulator uses adaptive current sensing to reliably monitor an inductor current in a cost-efficient and power-efficient manner. A semiconductor switch periodically turns on to conduct the inductor current. A voltage drop across the semiconductor switch is monitored when the semiconductor switch is on. A variable gain amplifier with an automatic gain control loop generates a feedback signal from the voltage drop of the semiconductor switch when conducting to provide an indication of the inductor current to a controller. The automatic gain control loop compensates for any variations in the on-resistance of the semiconductor switch.

20 Claims, 5 Drawing Sheets

U.S. PATENT DOCUMENTS

| | | |
|---|---|---|
| 6,498,466 B1 | 12/2002 | Edwards |
| 6,522,116 B1 | 2/2003 | Jordan |
| 6,528,976 B1 | 3/2003 | Lenk et al. |
| 6,611,131 B2 | 8/2003 | Edwards |
| 6,724,174 B1 | 4/2004 | Esteves et al. |
| 6,774,611 B2 | 8/2004 | Umminger et al. |
| 7,045,993 B1 | 5/2006 | Tomiyoshi |
| 7,119,522 B1 * | 10/2006 | Tomiyoshi ............ 323/224 |
| 7,265,530 B1 | 9/2007 | Broach et al. |
| 2002/0180413 A1 | 12/2002 | Umminger et al. |
| 2003/0038614 A1 | 2/2003 | Walters et al. |
| 2005/0035748 A1 * | 2/2005 | Inn ...................... 323/285 |
| 2005/0280404 A1 | 12/2005 | LeFevre |
| 2007/0252567 A1 | 11/2007 | Dearn et al. |

OTHER PUBLICATIONS

National Semiconductor, "LM3477: High Efficiency High-Side N-Channel Controller for Switching Regulator". National Semiconductor Corporation. Nov. 2003, pp. 1-22.

\* cited by examiner

US 7,919,952 B1

AUTOMATIC GAIN CONTROL TECHNIQUE FOR CURRENT MONITORING IN CURRENT-MODE SWITCHING REGULATORS

BACKGROUND OF THE INVENTION

1. Field of the Invention

The present invention relates generally to a power conversion circuit and more particularly to current monitoring in switching regulators.

2. Description of the Related Art

A power conversion circuit (e.g., a switching regulator) accepts a Direct Current (DC) voltage source at one level and outputs a desired DC voltage at another level. The switching regulator includes one or more semiconductor switches. The switches alternate between connecting and disconnecting the voltage source to circuits that drive the output. The output voltage level is related to the duty cycle of the switching. The switching is typically controlled by a Pulse-Width Modulation (PWM) circuit.

A switching regulator (or switched mode power supply) can be configured for voltage-mode operation or current-mode operation. In voltage-mode operation, an output voltage of the switching regulator is monitored to adjust switching duty cycle. In current-mode operation, the output voltage of the switching regulator and an inductor current are both monitored to adjust the switching duty cycle. The transient correction performance or compensation of a current-mode switching regulator is typically superior to a voltage-mode switching regulator.

A design challenge for the current-mode switching regulator is how to reliably monitor the inductor current. One common technique monitors a voltage across a small sense resistor coupled in series with a switch or an inductor. This common technique decreases power efficiency because of additional conversion loss due to the small sense resistor. A second technique uses a current-mirror circuit to monitor current conducted by the switch. The second technique is not possible when the switch and the current-mirror circuit are not parts of a common integrated circuit. A third technique monitors a voltage across the inductor and isolates contribution of the voltage due to current through the inductor's DC resistance. The third technique is difficult to implement because the inductor's DC resistance needs to be reliably constant and known apriori. Finally, a fourth technique monitors a voltage across the switch when the switch is on and divides the voltage by the switch's on-resistance to extract the inductor current. The main disadvantage of the fourth technique is that the switch's on-resistance typically varies significantly depending on manufacturing variation, temperature variation, and switch control variation.

SUMMARY OF THE INVENTION

Embodiments of the present inventions solve these and other problems by providing a switching regulator with an automatic gain control technique for current monitoring (or adaptive current sensing). In one embodiment, a current-mode switching regulator includes at least one semiconductor switch and an inductor. The semiconductor switch and the inductor can be configured for operation as a buck converter or a boost converter. In either configuration, the semiconductor switch periodically closes to conduct substantially the same current as the inductor, and the inductor current increases linearly while the semiconductor switch is closed. An automatic gain control circuit monitors a voltage across the semiconductor switch (e.g., a voltage drop across source-to-drain terminals of a MOSFET) and generates a feedback signal that is indicative of the inductor current when the semiconductor switch is closed. The feedback signal is provided to a controller which drives the semiconductor switch based on an output voltage feedback loop and the feedback signal. The output voltage feedback loop monitors an output voltage of the switching regulator with reference to an input control signal indicative of a desired output voltage.

The automatic gain control circuit and the controller can be realized in a common integrated circuit to advantageously reduce component count and circuit board size for the switching regulator. In one embodiment, the automatic gain control circuit includes a variable gain amplifier and an error amplifier. The variable gain amplifier senses the voltage across the semiconductor switch and outputs the feedback signal (or current feedback voltage). The error amplifier is part of an automatic gain control loop and compares the feedback signal with a predefined or user-selectable target gain signal to control gain of the variable gain amplifier.

In another embodiment, the automatic gain control circuit includes a variable gain amplifier, at least one sample and hold circuit, an error amplifier, and an optional filter. The variable gain amplifier monitors the voltage drop across the semiconductor switch and outputs the feedback signal. The sample and hold circuit, the error amplifier, and the optional filter comprise an automatic gain control loop. The sample and hold circuit detects a change (or rise) in the feedback signal's level over a predetermined time interval. For example, the detected change is derived by taking a difference between two samples of the output of the variable gain amplifier during each switching cycle, one sample taken shortly after the semiconductor switch closes and another sample taken before the semiconductor switch opens. The error amplifier compares the detected change with a desired change to generate a control signal that sets a gain factor for the variable gain amplifier. The optional filter (e.g., a low-pass filter) can be coupled to an output of the error amplifier to limit the bandwidth of the control signal to the variable gain amplifier.

In one embodiment, the controller includes an error amplifier, a comparator, and a latch to generate a driving signal for the semiconductor switch. The error amplifier is part of an output voltage feedback loop that monitors the output voltage of the current-mode switching regulator. The error amplifier generates an error signal (e.g., an error voltage) based on a difference between the output voltage (or a feedback voltage proportional to the output voltage) and a reference voltage indicative of the desired output voltage. The error voltage optionally includes slope compensation which can be combined at an output of the error amplifier. The comparator (e.g., a Schmitt trigger comparator) compares the error voltage with the current feedback voltage to generate a reset signal for the latch. An oscillator output periodically sets the latch, and the latch outputs the driving signal for the semiconductor switch with the pulse-width of the driving signal determined by the comparator output.

The automatic gain control technique facilitates efficient and reliable monitoring of inductor current in a current-mode switching regulator by sensing a voltage drop across a semiconductor switch. Discrete components and power loss are minimized by not using a sensing resistor. The voltage drop across the semiconductor switch provides an accurate indication of the inductor current with the automatic gain control technique compensating for parameter variations (e.g., on-resistance variations) in the semiconductor switch. For example, the voltage drop is processed by a variable gain amplifier and an automatic gain control loop adjusts the gain of the variable gain amplifier to provide an output with consistent proportionality to the inductor current although the on-resistance may change (e.g., by increasing the gain when the on-resistance decreases or decreasing the gain when the on-resistance increases). In other words, the automatic gain control technique tracks the on-resistance variations in the semiconductor switch to provide a predictable relationship (or transfer function) between the inductor current and the error voltage.

During active operation, the on-resistance of the semiconductor switch varies slowly (e.g., due to temperature or aging). In one embodiment, the automatic gain control loop has a relatively lower bandwidth to account for these variations while maintaining stable operations. For example, the bandwidth of the automatic gain control loop can be much lower (e.g., 100 times less) than the bandwidth of the output voltage feedback loop. In one embodiment, the semiconductor switch operates at a frequency that is near or greater than one Megahertz, and the output voltage feedback loop operates near 100 Kilohertz (or at 1/10 of the switching bandwidth) while the automatic gain control loop operates near one Kilohertz (or at approximately 1/1000 of the switching bandwidth).

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as maybe taught or suggested herein.

DETAILED DESCRIPTION OF THE PREFERRED EMBODIMENT

Figure 1:
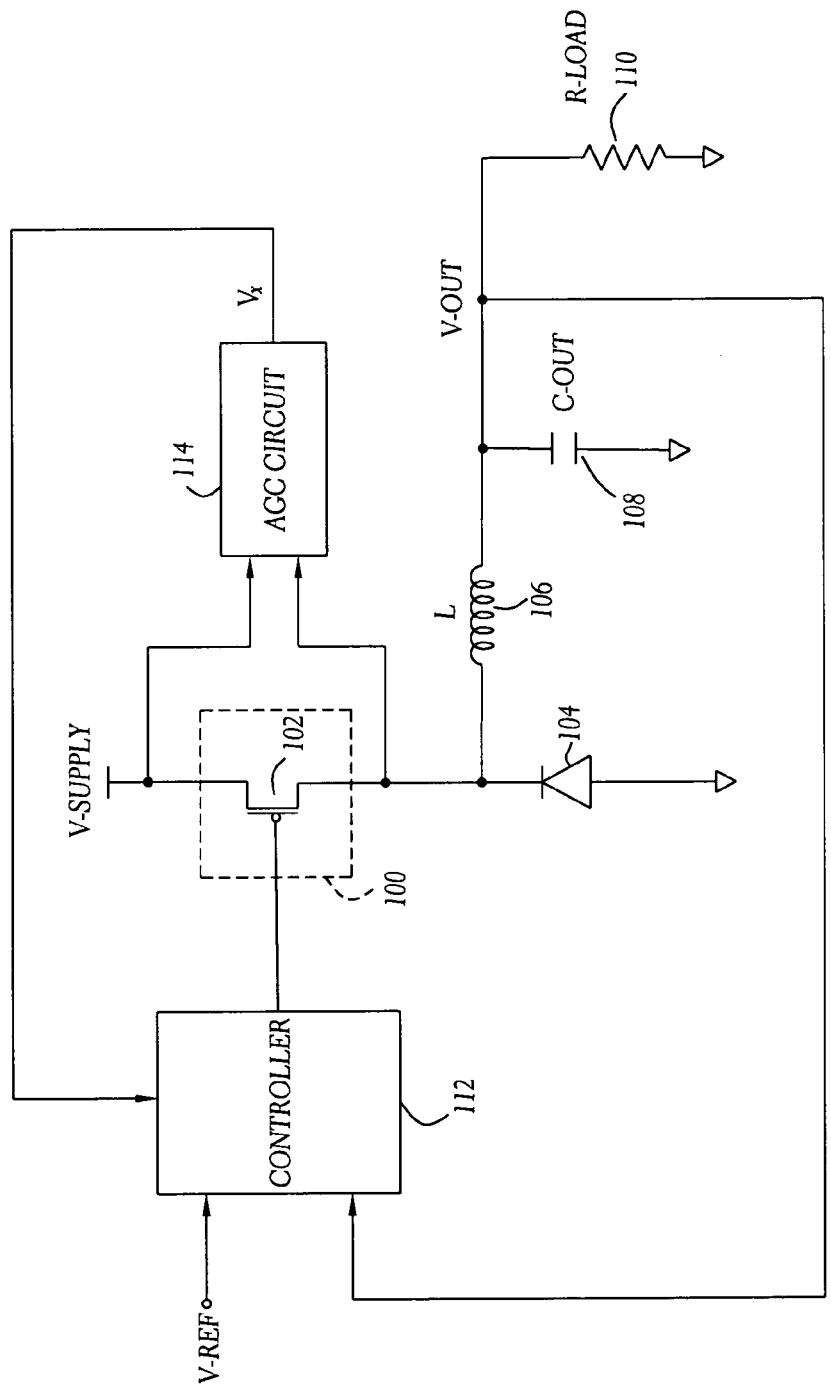
FIG. 1 is a block diagram of one embodiment of a buck converter using an automatic gain control technique for current monitoring.

Embodiments of the present invention will be described hereinafter with reference to the drawings. FIG. 1 is a block diagram of one embodiment of a current-mode buck converter using adaptive current sensing (or an automatic gain control technique for current monitoring). The current-mode buck converter accepts a DC source voltage (V-SUPPLY) of one level (e.g., power from a battery) and produces a DC output voltage (V-OUT) of another, and typically lower, level. A first semiconductor switch (or high-side switch) 100 is coupled between the DC source voltage (or supply voltage) and a first terminal of an inductor (L) 106. A second terminal of the inductor 106 is coupled to the DC output voltage. An output capacitor (C-OUT) 108 and an output resistor (R-LOAD) 110 are coupled to the DC output voltage to represent a load (e.g., a microprocessor). The output capacitor 108 can also represent filter capacitance used to reduce ripple in the DC output voltage. A diode 104 (or alternately a second semiconductor switch) is coupled between the first terminal of the inductor 106 and ground.

In the embodiment shown in FIG. 1, the high-side switch 100 is a p-type FET with a source terminal coupled to the supply voltage and a drain terminal coupled to the inductor 106. The high-side switch 100 can alternately be an n-type FET or other types of semiconductor switches (e.g., bipolar junction transistors). If present, the second semiconductor switch (or synchronous switch) is typically an n-type transistor.

A controller 112 provides a variable duty cycle signal to control the switching of the high-side switch 100. The first terminal of the inductor 106 is alternately coupled to the supply voltage when the high-side switch 100 is closed and coupled to ground through the diode 104 when the high-side switch 100 is opened. The current flowing through the inductor 106 increases when the high-side switch 100 is closed and decreases when the high-side switch 100 is opened. The DC transfer function (or output voltage) for the current-mode buck converter is substantially equal to the product of the supply voltage and the switching duty cycle.

In current-mode operation, the controller 112 monitors the inductor current on a cycle-by-cycle basis in addition to the output voltage in order to adjust the duty cycle of the signal controlling the first semiconductor switch 100. The controller 112 first compares the output voltage (or a signal indicative of the output voltage) with a reference voltage (V-REF) indicative of a desired output voltage. The result of this first comparison is then compared with a signal (e.g., Vx) indicative of the inductor current. An efficient method to monitor the inductor current is by sensing a voltage (e.g., a sensed voltage) across the high-side switch 100 when the high-side switch 100 is closed (or on). This method avoids efficiency loss present in other methods that use dedicated sensing resistors.

The inductor current and the current conducted by the high-side switch 100 are substantially identical when the high-side switch 100 is closed. The inductor current can be extracted by dividing the sensed voltage by the on-resistance of the high-side switch 100. The on-resistance (or resistance across a closed switch) varies with manufacturing process, temperature, and other operating conditions. In one embodiment, an automatic gain control (AGC) circuit 114 is used to extract the inductor current from the sensed voltage and provide the signal (Vx) indicative of the inductor current to the controller 112 when the high-side switch 100 is on. The AGC circuit 114 advantageously compensates for variations in the on-resistance of the high-side switch 100 to reliably monitor the inductor current during the time that the high-side switch 100 is closed. The AGC circuit 114 and the controller 112 can be implemented in the same integrated circuit.

Figure 2:
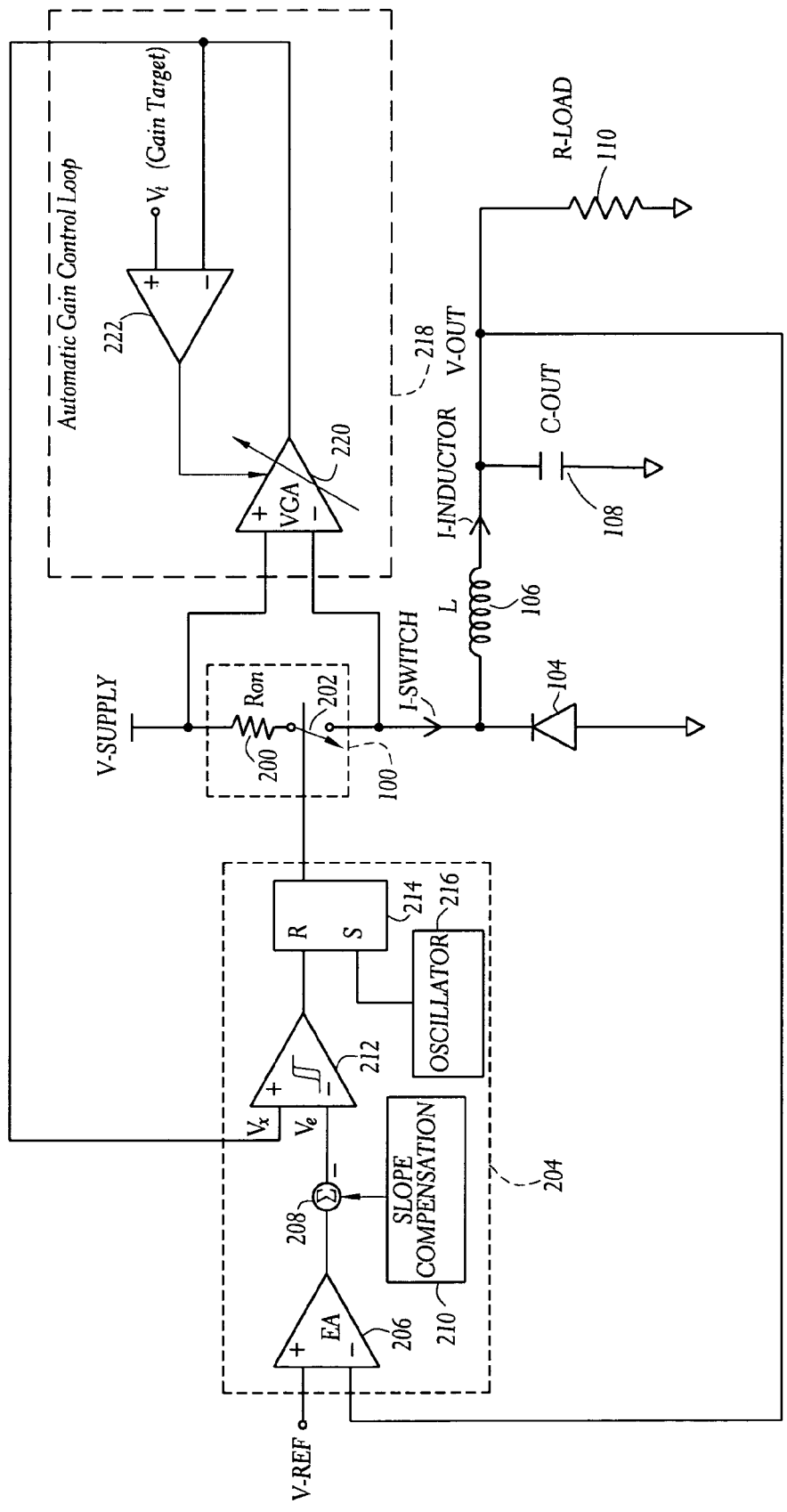
FIG. 2 is a detailed block diagram of one embodiment of an automatic gain control circuit and a controller for the buck converter shown in FIG. 1.

FIG. 2 is a detailed block diagram of one embodiment of an AGC circuit 218 and a controller 204 for the current-mode buck converter shown in FIG. 1. In FIG. 2, the first semiconductor switch (or high-side switch) 100 is represented by a circuit model comprising an on-resistance (Ron) 200 connected in series with a single-pole single-throw (SPST) switch 202. The AGC circuit 218 includes a variable gain amplifier (VGA) 220 and a first error amplifier 222. The VGA 220 has input terminals coupled across the high-side switch 100. For example, a non-inverting input is coupled to a node coupling the high-side switch 100 to the supply voltage and an inverting input is coupled to a node coupling the high-side switch 100 to the inductor 106.

In one embodiment, the VGA 220 is inactive (or does not generate useful information) when the high-side switch 100 is opened. When the high-side switch 100 (or the SPST switch 202) is closed, the high-side switch 100 conducts a current (I-SWITCH) that is substantially identical to an inductor current (I-INDUCTOR). Thus, a sensed voltage that is substantially equal to a product of the on-resistance 200 and the inductor current is presented across the input terminals of the VGA 220 when the high-side switch 100 is closed. In response, the VGA 220 generates a current feedback voltage (Vx) that is proportional to the sensed voltage at an output terminal: $Vx=I_L \times Ron \times K$. $I_L$ is the inductor current, Ron is the on-resistance (or on-time resistance) 200 of the high-side switch 100, and K is a gain factor of the VGA 220. The current feedback voltage is provided to the controller 204 as an indication of the inductor current level when the high-side switch 100 is closed.

The first error amplifier 222 in the AGC circuit 218 is part of an AGC feedback loop that automatically adjusts the gain factor of the VGA 220 to account for (or track out) variations in the on-resistance 200. The AGC feedback loop facilitates a reliable mapping between the inductor current and the current feedback voltage. Any variation in the on-resistance of the high-side switch 100 is countered (or balanced) by an appropriate adjustment in the gain factor for the VGA 220. In one embodiment, the first error amplifier 222 monitors the current feedback voltage and compares the current feedback voltage with a predefined or user selectable target gain (Vt) to adjust the gain factor of the VGA 220. For example, the output of the VGA 220 is provided to an inverting input of the first error amplifier 222. The target gain is provided to a non-inverting input of the first error amplifier 222. An output of the first error amplifier 222 controls the gain factor of the VGA 220.

In one embodiment, the controller 204 includes a second error amplifier 206, a comparator (e.g., a Schmitt trigger) 212, and a latch 214. The second error amplifier 206 is part of a voltage feedback loop that monitors the output voltage of the current-mode buck converter. In the embodiment shown in FIG. 2, the output voltage is provided as a feedback voltage to an inverting input of the second error amplifier 206. In other embodiments not shown, the output voltage can be scaled (e.g., by a resistor-divider) to generate the feedback voltage for the inverting input of the second error amplifier 206. A target voltage (V-REF) is provided to a non-inverting input of the second error amplifier 206. The target voltage (or reference voltage) is predefined or user-adjustable to represent a desired output voltage for the current-mode buck converter. The output of the second error amplifier 206 is adjusted based on a difference between the target voltage and the feedback voltage. The output of the second error amplifier 206 is used to generate an error voltage (Ve). In one embodiment, the controller 204 includes a slope compensation circuit 210. A summing circuit 208 combines an output of the slope compensation circuit 210 with the output of the second error amplifier 206 to generate the error voltage.

The error voltage is provided to an inverting input of the comparator 212. The current feedback voltage from the AGC circuit 218 is provided to a non-inverting input of the comparator 212. An output of the comparator 212 is coupled to a reset input of the latch 214. An output of an oscillator 216 is provided to a set input of the latch 214. The latch 214 outputs a driving signal to control the high-side switch 100. For example, the output of the oscillator 216 periodically sets the latch 214 and the driving signal closes the high-side switch 100. The inductor current increases linearly (or ramps up) while the high-side switch 100 is closed and the current feedback voltage increases correspondingly. The inductor current (on a cycle-by-cycle basis) is driven to a level that is substantially equivalent to the error voltage divided by the on-resistance of the high-side switch 100 and potentially further scaled by a linear gain. For example, when the current feedback voltage becomes greater than the error voltage, the output of the comparator 212 resets the latch 214 and the driving signal opens the high-side switch 100 until the next cycle. The inductor current decreases linearly while the high-side switch 100 is opened. Overall, the average inductor current increases as the error voltage increases and decreases as the error voltage decreases.

The output of the error amplifier 206 (or error voltage) provides an indication of the difference between the detected output voltage of the current-mode buck converter and the desired output voltage. The output of the VGA 220 (or current feedback voltage) provides an indication of the inductor current when the high-side switch 100 is closed. In one embodiment, the target gain in the AGC circuit 218 is used to facilitate appropriate mapping of the inductor current (represented by the current feedback voltage) to the error voltage for stable operation. This mapping (or overall loop dynamics) determines the amount of change in the inductor current for a given difference (represented by the error voltage) between the detected output voltage and the desired output voltage. In other words, the mapping determines the responsiveness of the current-mode buck converter. The AGC circuit 218 advantageously eliminates undesirable variations in the mapping due to parameter (e.g., on-resistance) variations in the high-side switch 100.

Figure 3A:
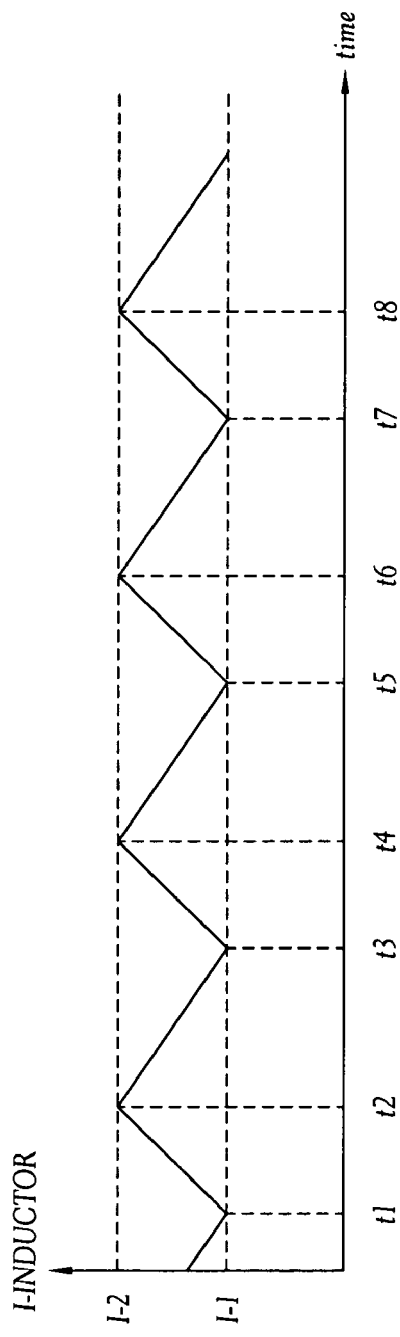
FIG. 3A illustrates current flowing through an inductor as a function of time.

FIG. 3A illustrates current flowing through the inductor 106 as a function of time. For example, the inductor current (I-INDUCTOR) linearly ramps from a first current level (I1) to a second current level (I2) during an on-duration of each periodic cycle. The on-duration corresponds to the time that the high-side switch 100 is closed (e.g., during times t1-t2, t3-t4, t5-t6, t7-t8). The inductor current linearly decreases from the second current level to the first current level during an off-duration of each periodic cycle (e.g., during times t2-t3, t4-t5, t6-t7). The high-side switch 100 is opened during the off-durations. The rate at which the inductor current ramps is related to the DC source (or supply) voltage (Vsource), the output voltage (Vout) and the value of the inductor (L):

$$\frac{di}{dt} = \frac{Vsource - Vout}{L}.$$

Since the DC source voltage, the output voltage and the value of the inductor are known (or predetermined), the inductor current ramp rate can also be known (or be easily determined).

Figure 3B:
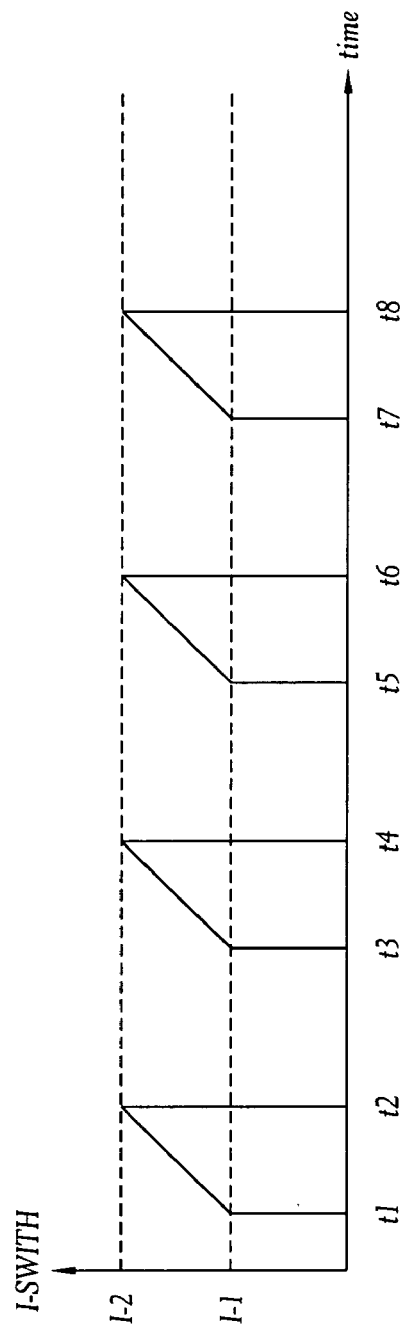
FIG. 3B illustrates current flowing through a semiconductor switch as a function of time.

FIG. 3B illustrates current flowing through the high-side switch 100 as a function of time. As discussed above, the high-side switch 100 substantially conducts the same current as the inductor current when the high-side switch 100 is closed. Thus, the switch current (I-switch) jumps to the first current level when the high-side switch 100 closes (e.g., at times t1, t3, t5, t7). Similar to the inductor current, the switch current linearly ramps from the first current level to the second current level during the on-duration of each periodic cycle. During the off-durations, the switch current is substantially zero. When the high-side switch 100 is closed, the amount of change in the switch current for a given time interval is predefined by the inductor current ramp rate and is advantageously independent of the DC current level through the high-side switch 100. This characteristic is used by the automatic gain control technique to track out resistance variations in the high-side switch 100 when monitoring the inductor current by sensing a change in voltage across the high-side switch 100 during a known period of time (e.g., during t1-t2, t3-t4, t5-t6, t7-t8).

Figure 4:
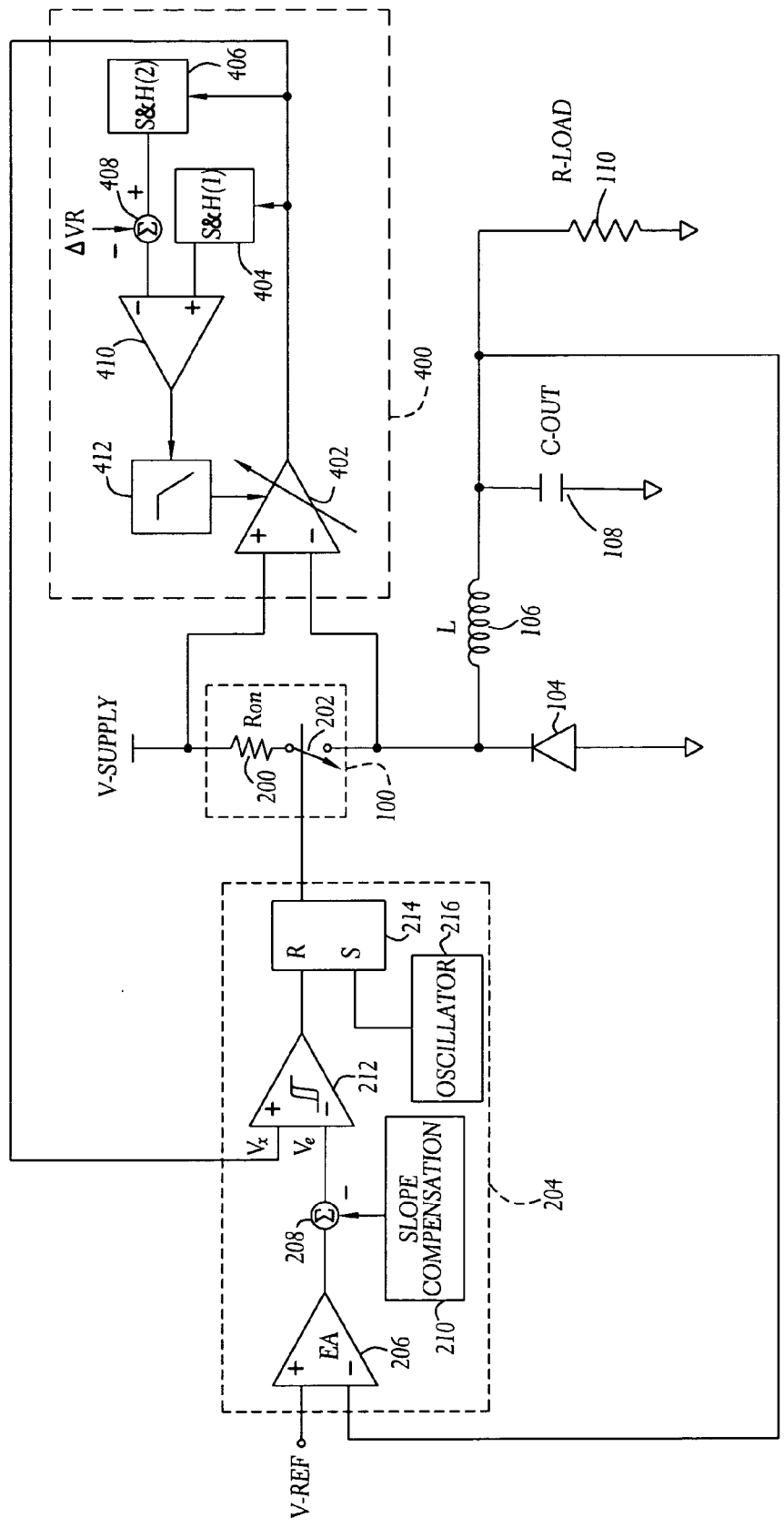
FIG. 4 is a more detailed block diagram of an automatic gain control circuit in conjunction with a DC-to-DC converter loop.

FIG. 4 is a detailed block diagram of another embodiment of an AGC circuit 400 used to monitor inductor current by sensing a voltage drop across a semiconductor switch. By way of example, the AGC circuit 400 is shown in a current-mode buck converter application with components and a controller 204 as described in FIG. 2. The AGC circuit 400 shown in FIG. 4 is a more detail embodiment for the AGC circuit 218 shown in FIG. 2. Similar to the AGC circuit 218 shown in FIG. 2, the AGC circuit 400 shown in FIG. 4 includes a VGA 402 with input terminals coupled across a high-side switch 100. The VGA 402 generates a current feedback voltage (Vx) for a controller 204. An AGC feedback loop monitors the current feedback voltage and adjusts a gain factor of the VGA 402 to counteract possible variations in on-time resistance of the high-side switch 100.

In one embodiment, the AGC feedback loop includes a sample and hold circuit comprising a first sample and hold stage (S&H(1)) 404 and a second sample and hold stage (S&H(2)) 406. The first sample and hold stage 404 and the second sample and hold stage 406 are coupled to an output of the VGA 402. The first sample and hold stage 404 takes a first sample of the current feedback voltage at time T1. The second sample and hold stage 406 takes a second sample of the current feedback voltage at time T2. In one embodiment, the time T1 corresponds to the start of every switching cycle when the high-side switch 100 turns on. Alternately, the time T1 can be a predefined time after the start of every switching cycle to allow time for switching noise and other transients to settle. The time T2 is selected to be a predetermined time after the time T1 when the high-side switch 100 is still conducting.

As discussed above in connection with FIG. 2, the current feedback voltage (Vx) is related to the inductor current ($I_L$), the on-resistance (Ron) of the high-side switch 100, and the gain factor (K) of the VGA 402: $Vx=I_L \times Ron \times K$. From the first and second samples of the current feedback voltage taken by the sample and hold circuit during the on-time of each switching cycle, a detected change (or rise) in the inductor current over a predetermined time interval (T2−T1) and multiplied by a scaling factor (Ron×K) can be found. As discussed above in connection with FIG. 3, an expected rise in the inductor current over a specified time (di/dt) during the on-time of each switching cycle is predefined by the supply voltage, the output voltage and the inductance value. The expected rise in the inductor current per specified time is advantageously independent of the DC (or average) inductor current.

Thus, the detected rise in the inductor current (multiplied by the scaling factor) can be compared with the expected rise in the inductor current (multiplied by a nominal scaling factor) to adjust the gain factor (K) of the VGA 402 in response to variations in the on-resistance (Ron) of the high-side switch 100. For example, if the on-resistance is 50% lower than typical, then the AGC feedback loop adjusts the gain factor of the VGA 402 to be two times higher than normal. If the on-resistance is 50% higher than typical, the AGC feedback loop adjusts the gain factor of the VGA 402 to be two times lower than normal. The AGC feedback loop facilitates consistent mapping (or correspondence) between the current feedback voltage and the inductor current by maintaining a substantially constant scaling factor over on-resistance variations.

In one embodiment, comparison of the sampled current feedback voltages and gain factor adjustment for the VGA 402 are implemented using an error amplifier 410 and a summing circuit 408. The first sample and hold stage 404 provides the first sample of the current feedback voltage to a non-inverting input of the error amplifier 410. The second sample and hold stage 406 provides the second sample of the current feedback voltage to the summing circuit 408. An input signal (ΔVR) corresponding to the expected (or desired) rise in the current feedback voltage is also provided to the summing circuit 408. The expected rise in the current feedback voltage is substantially equal to the expected rise in the inductor current scaled by the nominal constant factor.

The summing circuit 408 outputs a difference between the second sample of the current feedback voltage and the expected rise in the current feedback voltage to an inverting input of the error amplifier 410. The output of the summing circuit 408 is substantially equal to the first sample of the current feedback voltage if there are no changes in the on-resistance of the high-side switch 100. If the on-resistance has changed, the output of the summing circuit 408 is different than the first sample of the current feedback voltage, and an output of the error amplifier 410 is adjusted based on this difference. The output of the error amplifier 410 is used to control the gain factor of the VGA 402.

The gain factor of the VGA 420 may be updated during each switching cycle. However, the on-resistance of the high-side switch 100 varies relatively slowly (e.g., due to aging or temperature) during normal operations. Thus, the AGC feedback loop used to control the gain factor of the VGA 420 can have a relatively lower bandwidth to facilitate stable operations while tracking the on-resistance variations of the high-side switch 100. In one embodiment, an optional low-pass filter 412 is coupled between the output of the error amplifier 410 and the VGA 402 to limit the bandwidth of the AGC feedback loop. For example, the bandwidth of the AGC feedback loop is about 1000 times slower than the switching frequency of the high-side switch 100 or about 100 times slower than an output voltage feedback loop bandwidth. In one embodiment, the high-side switch 100 operates at approximately one Megahertz, the output voltage feedback loop operates at approximately 100 Kilohertz, and the AGC loop operates at approximately one Kilohertz.

The input signal representative of the expected rise in the current feedback voltage per given time maps (or is proportional) to the target gain of the AGC circuit 218 in FIG. 2. Similar to the target gain, the expected rise in the current feedback voltage per given time determines overall loop dynamics (i.e., the relationship between the inductor current and the error voltage of the controller 204). During each switching cycle, the high-side switch 100 turns on and allows the inductor current to ramp until the current feedback voltage (representative of the inductor current) is equal to or greater than the error voltage. The current feedback voltage is derived from a voltage drop across the high-side switch 100 which is subject to on-resistance variations. The AGC circuit 400 advantageously tracks out variations in the on-resistance of the high-side switch 100 to generate the current feedback voltage from the voltage drop across the high-side switch 100. The relationship between the inductor current and the current feedback voltage (and by extension the error voltage) becomes independent of the on-resistance variations. The inductor current and the error voltage have a known predictable relationship (or reliable transfer function) to maintain stable operations (or overall loop dynamics).

In one embodiment, the AGC circuit 400 (or the AGC circuit 218) and the controller 204 can be incorporated into a common integrated circuit. The common integrated circuit means extra components (e.g., an additional sensing resistor) are not needed for monitoring the inductor current. The number of components to be purchased and assembled on a printed circuit board (PCB) for the current-mode buck converter is advantageously minimized to reduce cost and PCB layout area.

Figure 5:
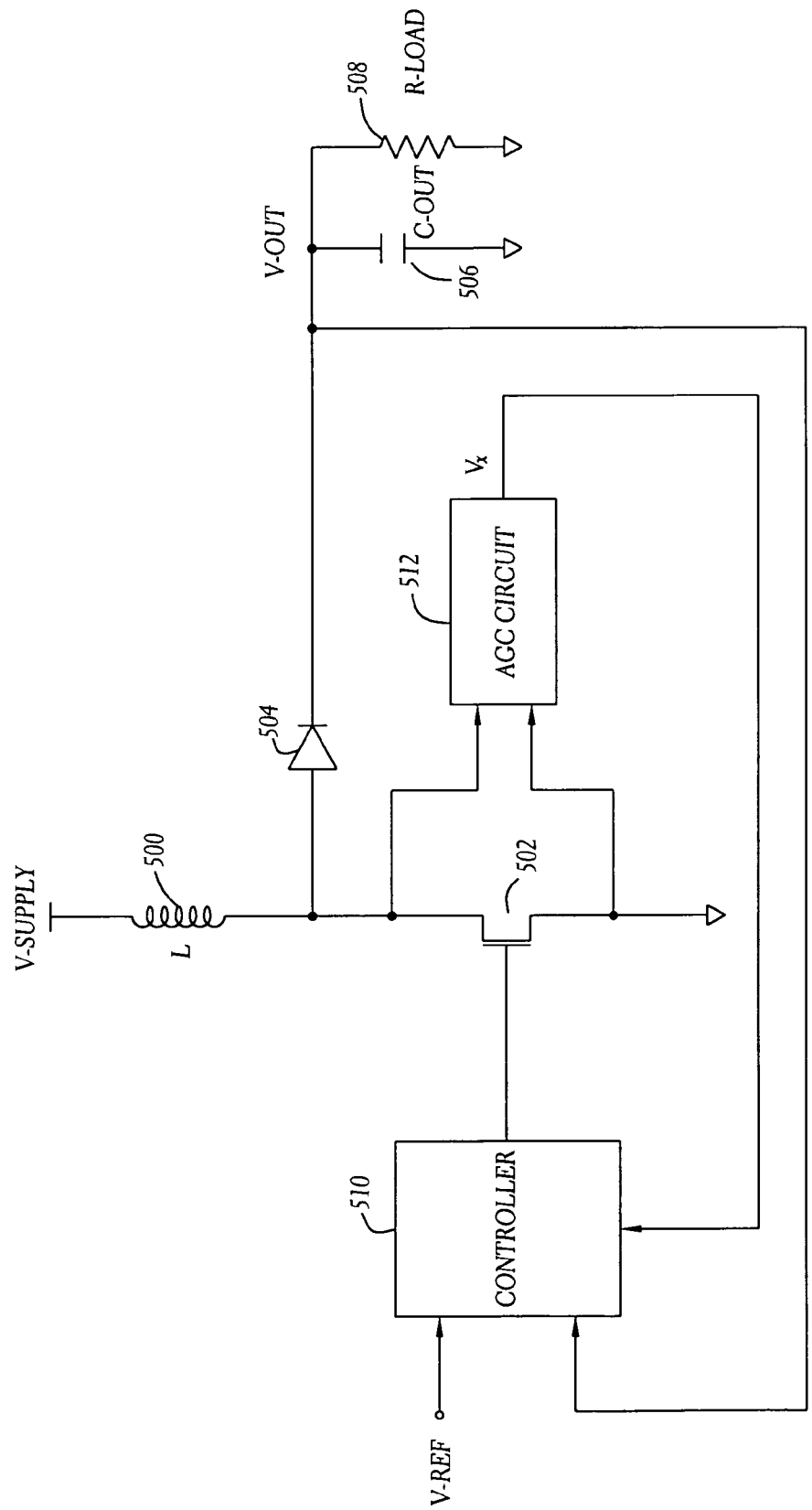
FIG. 5 is a block diagram of one embodiment of a boost converter using an automatic gain control technique for current monitoring.

The above embodiments illustrate an automatic gain control technique for current monitoring (or an adaptive current sensing technique) in a current-mode buck converter. The adaptive current sensing technique can be extended to other power conversion topologies that monitor current and desire decreased switching losses, PCB layout area and component cost. For example, FIG. 5 is a block diagram of one embodiment of a current-mode boost converter using the adaptive current sensing technique.

The current-mode boost converter accepts a DC source voltage (V-SUPPLY) of one level and produces a DC output voltage (V-OUT) of another, and typically higher, level. In one embodiment, the current-mode boost converter includes an input inductor 500, a switching transistor (or semiconductor switch) 502, an isolation diode 504 and an output capacitor (C-OUT) 506. The input inductor 500 is coupled between the DC source voltage and an intermediate node. The switching transistor (e.g., an N-FET) 502 is coupled between the intermediate node and ground. The isolation diode 504 has an anode coupled to the intermediate node and a cathode coupled to the DC output voltage. The output capacitor 506 is coupled between the DC output voltage and ground. An output resistor (R-LOAD) 508 is coupled in parallel with the output capacitor 506 to represent a resistive load.

A controller 510 accepts an input control signal representative of a desired output voltage for the current-mode boost converter. The controller 510 controls the switching transistor 502 to achieve and maintain the desired output voltage for the current-mode boost converter. The controller 510 monitors the DC output voltage and current flowing through the input inductor 500 to generate a variable pulse-width driving signal for the switching transistor 502. The variable pulse-width driving signal controls storage of electrical energy in the input inductor 500 and transfer of the electrical energy to the output of the current-mode boost converter. For example, current conducted by the input inductor 500 increases when the switching transistor 502 is on. When the switching transistor 502 is off, the current conducted by the input inductor 500 continues to flow and is provided to the output capacitor 506 and the output resistor 508.

The current conducted by the input inductor 500 and the current conducted by the switching transistor 502 are substantially identical when the switching transistor 502 is on. The controller 510 advantageously monitors the inductor current by sensing a voltage drop across the switching transistor 502 when the switching transistor 502 is on. For example, an AGC circuit 512 is used to generate a current feedback voltage (Vx) representative of the inductor current from the voltage drop across source-drain terminals when the switching transistor 502 is on. The AGC circuit 512 compensates for (or tracks) resistance variations in the switching transistor 502 to give a reliable indication of the inductor current.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A current-mode switching regulator comprising:
    at least one semiconductor switch and an inductor, wherein the semiconductor switch periodically closes to increase current conducted by the inductor;
    an automatic gain control circuit having a first terminal connected to a source terminal of the semiconductor switch and having a second terminal connected to a drain terminal of the semiconductor switch, the automatic gain control circuit configured to monitor a voltage across the semiconductor switch and to provide a feedback signal indicative of the current conducted by the inductor when the semiconductor switch is closed; and
    a controller configured to monitor an output voltage and to drive the semiconductor switch based on the output voltage, a reference voltage indicative of a desired output voltage, and the feedback signal.

2. The current-mode switching regulator of claim 1, wherein the current-mode switching regulator is a buck converter with the output voltage less than or substantially equal to a supply voltage.

3. The current-mode switching regulator of claim 1, wherein the current-mode switching regulator is a boost converter with the output voltage greater than or substantially equal to a supply voltage.

4. The current-mode switching regulator of claim 1, wherein the automatic gain control circuit and the controller are realized in a common integrated circuit.

5. The current-mode switching regulator of claim 1, wherein the automatic gain control circuit comprises:
    a variable gain amplifier configured to sense the voltage across the semiconductor switch and to output the feedback signal; and
    an error amplifier configured to compare the feedback signal with a predefined target gain to control gain of the variable gain amplifier.

6. The current-mode switching regulator of claim 1, wherein the automatic gain control circuit comprises:
    a variable gain amplifier;
    a sample and hold circuit configured to detect a change in an output of the variable gain amplifier over a predetermined time interval; and
    an error amplifier configured to compare the detected change with a desired change to set a gain factor for the variable gain amplifier.

7. The current-mode switching regulator of claim 1, wherein the controller comprises:
    an error amplifier configured to provide an error signal based on a difference between the output voltage and the reference voltage;
    a comparator configured to compare the error signal with the feedback signal; and
    a latch configured to output a driving signal to the semiconductor switch, wherein a periodic signal sets the latch and an output of the comparator resets the latch.

8. The current-mode switching regulator of claim 7, wherein slope compensation is combined at an output of the error amplifier to generate the error signal.

9. A method of monitoring inductor current for a current-mode switching regulator, the method comprising:

monitoring a voltage drop across a semiconductor switch, wherein the semiconductor switch periodically conducts to increase current flowing through an inductor;

using a variable gain circuit with an automatic gain control loop to generate a current feedback signal based on the voltage drop across the semiconductor switch, wherein the current feedback signal is proportional to the current flowing through the inductor when the semiconductor switch is conducting and the automatic gain control loop adjusts a gain factor of the variable gain circuit to compensate for parameter variations in the semiconductor switch; and providing the current feedback signal to a control circuit for the semiconductor switch, wherein the control circuit adjusts pulse-widths of a driving signal for the semiconductor switch based on the current feedback signal and an output voltage feedback loop that monitors an output voltage of the current-mode switching regulator with reference to an input control signal indicative of a desired output voltage.

10. The method of claim 9, wherein the semiconductor switch is a field-effect transistor and the voltage drop being monitored is from source to drain terminals.

11. The method of claim 9, wherein the gain factor is adjusted based on comparing an output of the variable gain circuit to a predefined target signal.

12. The method of claim 9, wherein the gain factor is adjusted based on sampling an output of the variable gain circuit at predefined time intervals and comparing a difference in the sampled outputs with a desired difference.

13. The method of claim 9, wherein the automatic gain control loop has a lower bandwidth than the output voltage feedback loop.

14. The method of claim 9, wherein the control circuit adjusts the pulse-widths of the driving signal by comparing the current feedback signal with an error signal, wherein the error signal is based on a difference between the input control signal and an output of the output voltage feedback loop.

15. A current-mode switching regulator comprising:

means for monitoring an inductor current by sensing a voltage drop across a semiconductor switch, the means for monitoring the inductor current arranged in a parallel configuration with the semiconductor switch, wherein the semiconductor switch periodically closes to conduct the inductor current;

means for processing the voltage drop across the semiconductor switch with a variable gain amplifier to produce a feedback voltage;

means for adjusting the variable gain amplifier to compensate for parameter variations in the semiconductor switch; and means for driving the semiconductor switch based on the feedback voltage to generate a desired output voltage for the current-mode switching regulator.

16. The current-mode switching regulator of claim 15, wherein means for adjusting the variable gain amplifier comprises:

means for detecting a rise in the voltage drop across the semiconductor switch per predetermined time;

means for generating a gain control signal based on a comparison of the detected rise to an expected rise; and means for limiting the gain control signal's bandwidth, wherein the gain control signal controls the variable gain amplifier's gain factor.

17. The current-mode switching regulator of claim 15, wherein means for driving the semiconductor switch comprises:

means for monitoring an output voltage of the current-mode switching regulator;

means for generating an error voltage based on a difference between the output voltage and the desired output voltage;

means for providing a substantially fixed frequency driving signal to the semiconductor switch; and means for adjusting the driving signal's pulse-width based on a difference between the feedback voltage and the error voltage.

18. A method for monitoring current in a current-mode switching regulator, the method comprising:

monitoring an inductor current by sensing a voltage drop across a semiconductor switch between a drain terminal of the semiconductor switch and a source terminal of the semiconductor switch, wherein the semiconductor switch periodically closes to conduct the inductor current;

processing the voltage drop across the semiconductor switch with a variable gain amplifier to produce a feedback voltage;

adjusting the variable gain amplifier to compensate for parameter variations in the semiconductor switch; and driving the semiconductor switch based on the feedback voltage to generate a desired output voltage.

19. The method of claim 18, wherein adjusting the variable gain amplifier comprises:

detecting a rise in the voltage drop across the semiconductor switch per predetermined time;

generating a gain control signal based on a comparison of the detected rise to an expected rise; and limiting the gain control signal's bandwidth, wherein the gain control signal controls the variable gain amplifier's gain factor.

20. The method of claim 18, wherein driving the semiconductor switch comprises:

monitoring an output voltage;

generating an error voltage based on a difference between the output voltage and the desired output voltage;

providing a substantially fixed frequency driving signal to the semiconductor switch; and adjusting the driving signal's pulse-width based on a difference between the feedback voltage and the error voltage.

* * * * *